US008465809B2

(12) United States Patent
Sanjurjo et al.

(10) Patent No.: US 8,465,809 B2
(45) Date of Patent: Jun. 18, 2013

(54) MULTIARC DISCHARGE MOVING BED REACTOR SYSTEM

(75) Inventors: Angel Sanjurjo, San Jose, CA (US);
Kazunori Matsumoto, Imizu (JP);
Carles Colominas, Vacarisses (ES);
Gopala Krishnan, Sunnyvale, CA (US);
Palitha Jayaweera, Fremont, CA (US);
Kai-Hung Lau, Cupertino, CA (US)

(73) Assignee: SRI International, Menlo Park, CA (US)

( * ) Notice: Subject to any disclaimer, the term of this patent is extended or adjusted under 35 U.S.C. 154(b) by 870 days.

(21) Appl. No.: 12/299,584

(22) PCT Filed: May 4, 2007

(86) PCT No.: PCT/US2007/010900
§ 371 (c)(1),
(2), (4) Date: Jul. 16, 2009

(87) PCT Pub. No.: WO2007/130613
PCT Pub. Date: Nov. 15, 2007

(65) Prior Publication Data
US 2009/0291235 A1    Nov. 26, 2009

Related U.S. Application Data

(60) Provisional application No. 60/746,470, filed on May 4, 2006.

(51) Int. Cl.
*B05D 1/22* (2006.01)
(52) U.S. Cl.
USPC ......... 427/460; 427/213; 427/434.5; 427/580

(58) Field of Classification Search
USPC .......................................... 427/460
See application file for complete search history.

(56) References Cited

U.S. PATENT DOCUMENTS

| 2,399,951 | A | * | 5/1946 | Suits ........................ 422/186.29 |
| 3,690,298 | A | * | 9/1972 | Venturi ........................ 118/629 |
| 4,436,984 | A | * | 3/1984 | Hare et al. ................... 219/383 |
| 4,685,419 | A | * | 8/1987 | Nakajima ..................... 118/620 |
| 4,810,524 | A | * | 3/1989 | Nakayama et al. ........... 427/490 |
| 4,954,320 | A | * | 9/1990 | Birmingham et al. ... 422/186.04 |
| 5,006,317 | A | * | 4/1991 | Sanjurjo ..................... 117/207 |

(Continued)

FOREIGN PATENT DOCUMENTS
WO    WO 2005039753 A1 *  5/2005

OTHER PUBLICATIONS

International Preliminary Report on Patentability, PCT/US2007/010900, Issued Nov. 4, 2008.*

(Continued)

*Primary Examiner* — Timothy Meeks
*Assistant Examiner* — Michael P Rodriguez

(57) ABSTRACT

A moving bed reactor system is provided. The system comprises at least one gas inlet, a distributor, a temperature control, a plurality of electrodes, and a spark control circuit. The spark control circuit drives the electrodes and generates a multi-arc discharge when the system is loaded with particles and a gas at approximately atmospheric pressure or greater is being pumped through the system. The multi-arc discharge is useful to create activated species which may improve the rate of a chemical reaction taking place in the moving bed reactor system.

11 Claims, 4 Drawing Sheets

U.S. PATENT DOCUMENTS

| | | | | |
|---|---|---|---|---|
| 5,254,231 | A | * | 10/1993 | Heath et al. .................... 204/164 |
| 5,340,618 | A | * | 8/1994 | Tanisaki et al. ............... 427/488 |
| 5,399,832 | A | * | 3/1995 | Tanisaki et al. ........... 219/121.47 |
| 5,620,743 | A | * | 4/1997 | Harth et al. .................... 427/213 |
| 5,695,826 | A | * | 12/1997 | Escallon ....................... 427/477 |
| 5,843,288 | A | * | 12/1998 | Yamamoto .................... 204/164 |
| 5,876,684 | A | * | 3/1999 | Withers et al. ............ 423/445 B |
| 2005/0069652 | A1 | * | 3/2005 | Allen et al. .................... 427/459 |
| 2005/0097991 | A1 | * | 5/2005 | Sanjurjo et al. ................. 75/351 |

OTHER PUBLICATIONS

Grothaus et al., Harmful Compounds Yield to Nonthermal Plasma Reactor, SwRI Technology Today, Available at http://www.swri.org/3pubs/ttoday/spring96/ttoday2.htm as of Jan. 25, 1997, Accessed May 21, 2012.*

Jung et al., Surface Modification of Fine Powders by Atmospheric Pressure Plasma in a Circulating Fluidized Bed Reactor, Ind. Eng. Chem. Res. 2004, 43, 5483-5488.*

Tap et al., Dual PE-CVD Circulating Fluidized Bed Reactor, IEEE Transactions on Plasma Science, vol. 32, No. 5, Oct. 2004.*

Sanjurjo et al., Chemical Vapor Deposition in Fluidized Bed Reactors, Surface and Coatings Technology, vols. 54-55, Part 1, Nov. 16, 1992, pp. 219-223.*

Sanjurjo et al., Titanium-based Coatings on Copper by Chemical Vapor Deposition in Fluidized Bed Reactors, Surface and Coatings Technology, vol. 49 Issues 1-3, Dec. 10, 1991, pp. 110-115.*

Wood et al., Coating Particles by Chemical Vapor Deposition in Fluidized Bed Reactors, Surface and Coatings Technology, vol. 49, Issues 1-3, Dec. 10, 1991, pp. 228-232.*

A. Czernichowski, Gliding arc. Applications to engineering and environment control, Pure & Appl. Chem., vol. 66, No. 6, pp. 1301-1310, 1994.*

Sanchez et al., Plasma-enhanced Chemical Vapor Deposition of Nitrides on Fluidized Particles, Powder Technology, 120 (2001) 134-140.*

Urashima et al., Removal of Volatile Organic Compounds from Air Streams and Industrial Flue Gases by Non-Thermal Plasma Technology, IEEE Transactions on Dielectrics and Electrical Insulation, vol. 7 No. 5, Oct. 2000.*

Pigford et al., Hydrodynamic Stability of a Fluidized Bed, I & EC Fundamentals, vol. 4, No. 1, Feb. 1965, pp. 81-87.*

* cited by examiner

MULTIARC DISCHARGE MOVING BED REACTOR SYSTEM

CROSS-REFERENCE TO RELATED APPLICATIONS

This application claims priority to U.S. Provisional Patent App. No. 60/746,470, filed May 4, 2006, which is incorporated by reference in its entirety.

TECHNICAL FIELD

This invention relates generally to moving bed reactors and in particular to moving bed reactors in which an electrical discharge is induced in order to speed up or modify chemical reactions.

BACKGROUND ART

Many chemical reactions will proceed at a higher reaction rate or through a different path if one or more of the reactants has been passed through an electrical discharge. The use of an electrical discharge will often allow these reactions to go forward at reasonable speeds at a lower overall temperature than would otherwise be the case. The use of a lower temperature is generally advantageous from a process perspective, since that requires for example less energy.

Roughly speaking one may think of the collisions of reactants with ions and electrons in an electrical discharge as a substitute for the collisions of reactants with other reactants which occur at higher temperatures. Both types of collisions may create activated species which allow the reactions to go forward more rapidly. Naturally, the activated species formed when an electrical discharge is used may not be precisely the same as those formed when the reactants are simply heated to a higher temperature, but often an acceleration of the reaction of interest is nonetheless achieved.

A well-known example of reactions assisted by electrical discharges is the plasma-enhanced chemical vapor deposition of many substances (e.g., silicon or silicon nitride), which is used in the semiconductor industry. In general plasma-assisted reactions have found considerable application in the deposition of thin films.

Plasma-assisted reactions generally take place at low pressures, for example 1 Torr. Low pressures require that the reactions be carried out in pressure vessels which can withstand atmospheric pressure. They also require vacuum pumping systems to keep the pressure low. The pressure vessels may in some cases be limiting as to the size and shape of the materials on which one is operating.

In some prior art references the use of atmospheric pressure plasmas has been disclosed. For example, U.S. Pat. No. 5,399,832 to Tanisaki et al. discloses an apparatus and process to coat or treat surfaces of particles in a glow discharge plasma (strictly speaking, a barrier glow discharge plasma) produced by two electrodes partially coated by a dielectric. The reactor works at atmospheric pressure and employs frequencies of 20 kHz or higher and voltages of 1 to 10 kV.

Plasma torches such as those used for coating or incinerators are examples of atmospheric or above atmospheric plasma reactors. An inert gas is jetted (at supersonic velocities in the case of coatings) between two closely spaced water cooled electrodes. They are kept at a potential difference 50 to 70 V and a current of several hundred amperes passes through the arc discharge plasma so generated, which projects along the path of the gas flow. Very high temperatures (up to 10,000° C.) are achieved, enough to melt powders or to decompose molecules passing through the plasma plume. The residence time can be as short as microseconds so that the completion or extent of reaction may not be complete.

There is a need in the art for more economical and convenient ways to gain the benefits of discharge-assisted reactions.

DISCLOSURE OF THE INVENTION

In an aspect of the invention, a moving bed reactor system is provided. The system comprises at least one gas inlet, a distributor, a temperature control, a plurality of electrodes, and a spark control circuit. The spark control circuit drives the electrodes and generates a multi-arc discharge, as described below, when the system is loaded with particles and a gas at approximately atmospheric pressure or greater is being pumped through the system.

DETAILED DESCRIPTION OF PREFERRED EMBODIMENTS

Before describing the present invention in detail, it is to be understood that this invention is not limited to specific materials or device structures or geometries, as such may vary. It is also to be understood that the terminology used herein is for the purpose of describing particular embodiments only, and is not intended to be limiting.

As used in this specification and the appended claims, the singular forms "a," "an," and "the" include both singular and plural referents unless the context clearly dictates otherwise. Thus, for example, reference to "an active ingredient" includes a plurality of active ingredients as well as a single active ingredient, reference to "a temperature" includes a plurality of temperatures as well as single temperature, and the like.

It has been discovered that in a fluidized bed reactor which has fluid at approximately atmospheric pressure flowing through it and suitably sized electrodes being excited at appropriate frequencies and voltages, it is possible to observe an intermittent discharge which we call "multi-arc." This discharge is characterized by the existence of arcs which start at one electrode or inside the particle bed, and proceed towards the other electrode, passing through or near particles in the fluidized bed reactor. The individual arcs may last, for example, for milliseconds to seconds. The discharges persist continuously as long as the fluid flows, the density of particles is maintained, and the electrodes are excited at appropriate frequencies and voltages.

Although reference is made here primarily to fluidized beds, it is understood that other similar moving bed reactors, such as entrained beds, rotary kilns, and cascade beds, will have similar ability to benefit from our invention.

Figure 1:
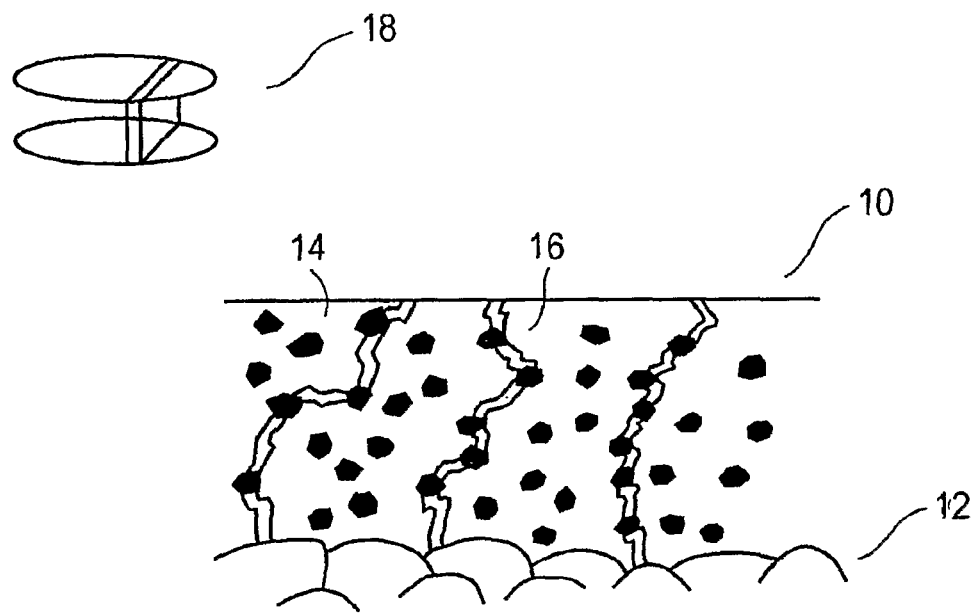
FIG. 1 schematically depicts a multi-arc discharge.

The general appearance of a multi-arc discharge may be understood by reference to FIG. 1. The figure depicts schematically an elevation view of a thin cross section of a multi-arc discharge between two parallel electrodes 10 and 12. The cross section is taken perpendicular to the electrodes, as depicted in the inset 18. The entire discharge would consist of a number of such cross sections stacked against each other. FIG. 1 is not to scale. In particular, the particles such as 14 are depicted as larger than would normally be expected for a realistic separation between electrodes 10 and 12.

As may be seen in FIG. 1, a multi-arc discharge exists in a fluidized bed or similar fluidized collection of particles such as 14 moving in a fluid. The discharge consists of a multitude of small arcs such as 16 going either from an electrode to a particle or between two particles or between two electrodes. While the arcs depicted in FIG. 1 remain within the cross-section shown in the figure, it is also possible for arcs to go from a particle in one cross-section to a particle in another cross section like the on depicted. The cross-sections are merely an artificial subdivision of the space between the electrodes which we adopt for ease in depicting schematically the multi-arc discharge.

Without being bound by theory, it is hypothesized that a multi-arc discharge occurs because the individual particles in a fluidized bed reactor act in combination with the electrodes as a variable capacitor with continuous locally variable dimensions. The electric fields so created on occasion exceed the breakdown voltage of the gas or gases in the bed. Small arcs form, and those arcs are then able to propagate from particle to particle.

Multi-arc discharges may be produced with an apparent bed density of particles in the fluidized bed reactor which is, for example, about 0.1 g/cm$^3$ to about 0.3 g/cm$^3$ to about 1 g/cm$^3$ to about 3 g/cm$^3$ to about 10 g/cm$^3$. This density is taken relative to the volume in which the particles are fluidized.

A wide range of particles may be used in the bed. They may take part in the chemical reaction which is being assisted by the multi-arc discharge, for example by having a coating deposited on them as a result of that reaction. Alternatively, they may be inert particles which are in the bed solely to facilitate the formation of the discharge. The particles may be, for example, metallic, ceramic, organic, semiconductor, or composite. The particles may be from about 1 μm in mean diameter to about 10 μm, 100 μm, about 300 μm, about 500 μm, or about 1 mm in mean diameter.

A wide range of gases may be introduced into the fluidized bed. Such gases may be inert gases chosen simply to assist in the fluidization, as for example noble gases, or they may alternatively be reactive gases that take part in the chemical reaction. The fluidizing gas or gases should have a flow rate into the bed sufficient for it to be fluidized. Preferably the gases should have a flow rate that does not cause the production of large bubbles in the fluidized bed. As is known to those skilled in the art, the precise rate of flow sufficient to initiate fluidization with a given collection of particles may depend, inter alia, on the particle size distribution and density of the particles.

As is known by persons of skill in the art, a fluidized bed reactor design may differ, for example, according to whether the process is intended for batch or continuous practice. Design may differ also, for example, based on whether the particles are a product of the process. In addition, depending on the heat generated by the reaction carried out in the reactor, it may be necessary to provide for cooling, for example by tubes embedded in the fluidized bed cooled by the circulation of a liquid such as water through the tubes. Many other design considerations for fluidized bed reactors exist.

A general introductory reference on the design of fluidized bed reactors is J. R. Howard, *Fluidized Bed Technology: Principles and Applications* (Bristol, 1989).

The multi-arc discharges of the invention may be useful in accelerating any reaction already known to be assisted by the formation of reactive species in a discharge of some type. There is an extensive literature on such reactions which carried out with the assistance of low-pressure plasmas, corona discharges, dielectric barrier discharges, and the like.

Reactions which are accelerated by multi-arc discharges may, for example, occur between gases. They may alternatively occur between one or more gases and the surface of the particles, as for example when the reaction results in the deposition of a layer upon the surface of the particles or in the etching away of a portion of the surface of the particles. The reactions may alternatively occur between one or more gases which have passed through the multi-arc discharge and then impinge upon a surface, or upon a liquid, or upon a solid workpiece of some shape.

It should be understood that when we say that reactions occur between gases or between a gas and something else such as a particle or workpiece, we include a situation in which intermediates are formed from gas molecules (by means of the discharge or otherwise), and these intermediates go on to react further. It is believed that the formation of such reactive intermediates is a common occurrence in reactions involving gases in a discharge or gases which have passed through a discharge. The intermediates may be ions, radicals, adsorbates, absorbates, or other types of intermediates. The formation of these species may be enhanced by the addition to the particles in the bed or the surface of the particles of catalytic materials, coatings, or islands that can affect the reaction rate or extent or direction as well as absorbants materials that may absorb part of the products or byproducts, thus reducing their presence in the gas phase and increasing the overall reaction rate and extent, or even changing the composition of the final products.

The reactions for which a multi-arc discharge is useful may, for example, include the depositions of oxides, nitrides, and carbides that are carried out with plasma-enhanced chemical vapor deposition in the semiconductor industry. The reactions may include, for example, depositions which result in films of $SiN_xO_y$, $SiC_xH_y$, or $SiO_xC_yH_z$ with varying values of x, y, and z. Silicon depositions may employ, for example, chlorosilanes. Silica depositions may employ, for example, tetraethyl orthosilicate (TEOS). These depositions may be carried on a wide variety of substrates, for example ceramics, semiconductors, or metals.

A multi-arc discharge may also be useful, for example, for surface treatments of particles in which the particles are cleaned or etched in some manner by bombardment of ions from the discharge or by reaction with suitable cleaning or etching gases, for example halides, oxygen, or ammonia. Surface treatments of this type may, for example, serve to facilitate adhesion of additional layers to the surfaces treated. Such treatments using plasma discharges are particularly used for polymeric materials. Surface treatments may, for example, be used to render a polymeric material more hydrophilic or more dispersible. Hydrophilicity may be achieved, for example, by using oxygen gas to create C=O and C(O)O groups on a vinyl polymer backbone.

Reactions for which the multi-arc discharge is useful include, for example, halogenation of metals, such as titanium. The reactions may be carried out using metal particles in the fluidized bed and a process gas which can halogenate the metal particles. A discussion of some reactions in this class is found in U.S. Published Patent Application No. 2005/0097991, assigned to the same assignee as the present application.

Reactions in which halogenated organic compounds are converted to potentially less harmful species are a further class of reactions for which multi-arc discharges may be useful. Example 2 shows the utility of multi-arc discharges for the reaction $CCl_4+2H_2O \rightarrow CO_2+4HCl$. Multi-arc discharges would also be expected to be useful for reactions of $CCl_4$ with oxygen. More generally, multi-arc discharges would be expected to be useful to dispose of undesired types of compounds such as dioxins, even when they are present in a low concentration such as less than a part per million by volume.

More generally, multi-arc discharges may be useful for processes which involve converting undesirable substances to potentially less harmful species, since variations between the discharge-assisted and unassisted reactions may be acceptable as long as the undesirable substance is eliminated.

Other reactions which may benefit from a multi-arc discharge would be, for example, those discussed in U.S. Pat. Nos. 4,810,524, 5,372,799, and 5,399,832.

Other reactions that may benefit from multi-arc discharges are those that generally are not perceived as practical with normal thermal systems even when operating at very high temperatures, including those not possible at over 1000° C. and even over 1500° C. For example, production of metals by reduction of many ores such as oxide ores by $H_2$ is not possible even at temperatures over 1000° C. Examples are $SiO_2$ and $TiO_2$. A multi-arc discharge approach permits the formation of atomic hydrogen, which does have the reductive power to produce metals from those oxides.

The reactions of interest may take place within the area in which the multi-arc discharge is occurring. Alternatively, such reactions may take place in an area to which a gas or gases flow after passing through the multi-arc discharge.

Figure 3:
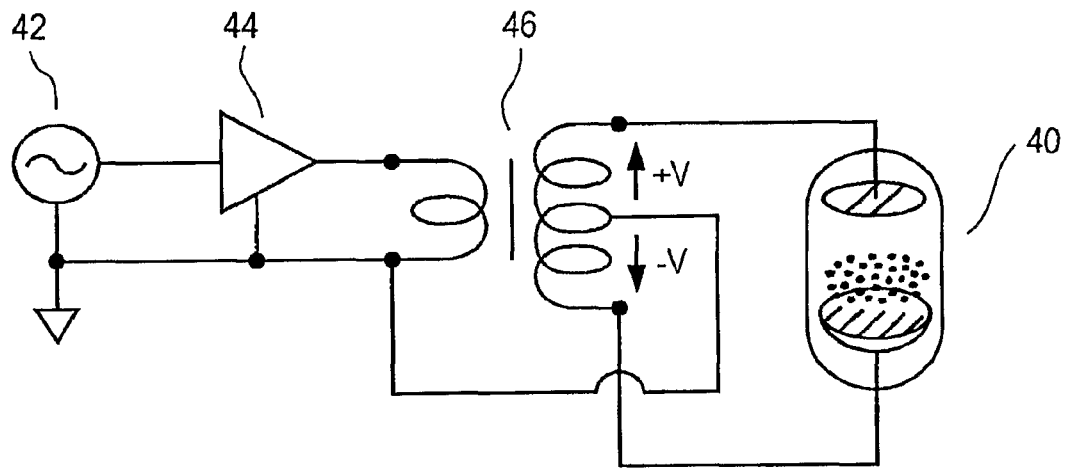
FIG. 3 schematically depicts a possible control system for generating a multi-arc discharge.

In order to produce a multi-arc discharge it is convenient to have a control circuit which energizes the electrodes at appropriate voltages and frequencies to produce a discharge of that type. The control circuit may be a simple analog oscillator, power amplifier, and voltage divider or transformer, or it may be a more complex electronic circuit capable, for example, of communicating with a computer which may be able to control multiple instruments and actuators. FIG. 3 depicts a simple arrangement for energizing two electrodes. An oscillator 42 generates a waveform which is passed to a power amplifier 44. A transformer 46 is used at the output of the power amplifier 44 to produce voltages which swings up and down above and below ground at the outputs in order to drive two electrodes within the fluidized bed reactor 40.

Where the control circuit can communicate with a computer, the computer may control the voltages and frequencies which are applied to the electrodes in order to produce the discharge, and may also monitor or control, for example, the actuators, for example pumps and valves, which are used to feed the fluidized bed reactor. The computer may also use information on the operation of the discharge, for example information from temperature sensors, plasma-diagnostic style probes, or optical sensors, to drive the electrodes and/or to control the actuators which determine how the reactor is fed. This computer control may be particularly useful, for example, in the startup phase of the reactor. The computer control may be part of a larger integrated control system covering a variety of conditions relating to the operation of the fluidized bed reactor or of a larger process of which it is a part. The computer control may be expected also to maintain records of the operation of the reactor, for example on disk storage, or to dispatch information about the operation of the reactor over a communications medium of some sort to other computer systems.

The control circuit would be expected in many cases to have some type of operator interface allowing an operator to control the operation of the system. This interface could, for example, be implemented in a computer with which the control circuit communicates, or it may be implemented with buttons and dials, or by a combination of the two.

To produce a multi-arc discharge it is preferred to energize the electrodes at a frequency predominantly or substantially under 20 kHz, including for example with DC voltages. More preferably, the electrodes are energized at a frequency between about 1 kHz and about 3 kHz. Alternatively, the electrodes may be energized at two or more frequencies, including energizing at DC.

The voltages which are employed will depend on the distance between the electrodes, since electrical discharges in general have been observed to have thresholds at particular electric field strengths. In general, for small laboratory scale reactors a voltage of no more than about 10 kV may be employed.

Figure 2:
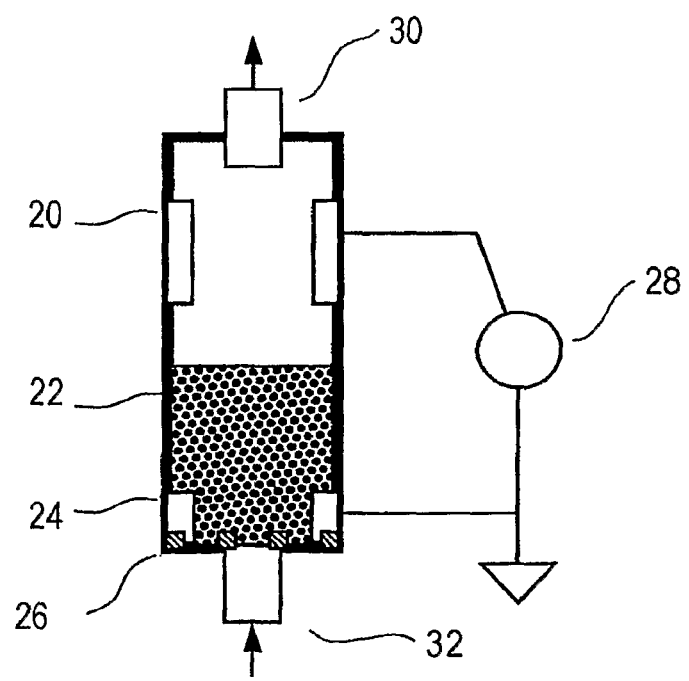
FIG. 2 schematically depicts an exemplary system for generating a multi-arc condition.

A wide variety of electrode shapes and arrangements may be employed. In FIG. 2, a simple arrangement of two cylindrical hollow electrodes is shown. We have a cylindrical reactor with distributor plate 26, gas inlet 32 and gas outlet 30. A lower hollow electrode 24 is in contact with the bed 22. The upper hollow electrode 20 can be still immersed in the bed 22 above the first one 24, or at the top of the bed or above the bed up to 2 cm higher for voltages in the kV level. The power oscillator 28 provides power to the two electrodes.

It is alternatively possible to have a variant on FIG. 2 in which only the upper hollow electrode 20 is present, and the distributor plate 26 serves as a second electrode.

Figure 4:
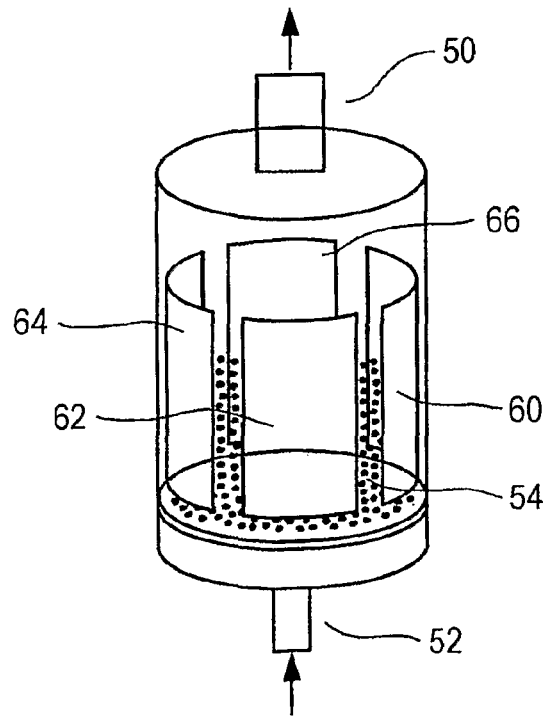
FIG. 4 depicts a second exemplary system for generating a multi-arc condition which works with four electrodes.

In FIG. 4, an alternate arrangement of electrodes is shown, in which there are four electrodes 60, 62, 64, and 66. As may be seen, these four electrodes are arranged to form a cylinder around the fluidized bed. The electrodes may be energized in a pattern which rotates around the cylinder. For example, electrodes numbers 60, 62, 64, and 66 may be energized with the same waveform but at different phases, so that the phase of the waveform energizing electrode 62 is offset 90° from that energizing electrode 60, the phase of the waveform energizing electrode 64 is offset 180° from that energizing electrode 60, and the phase of the waveform energizing electrode 66 is offset 270° from that energizing electrode 60.

Other arrangements involving multiple electrodes energized with different-phase versions of the same waveform are possible. For example, three electrodes could be employed which are energized by three-phase power type waveforms.

Figure 5:
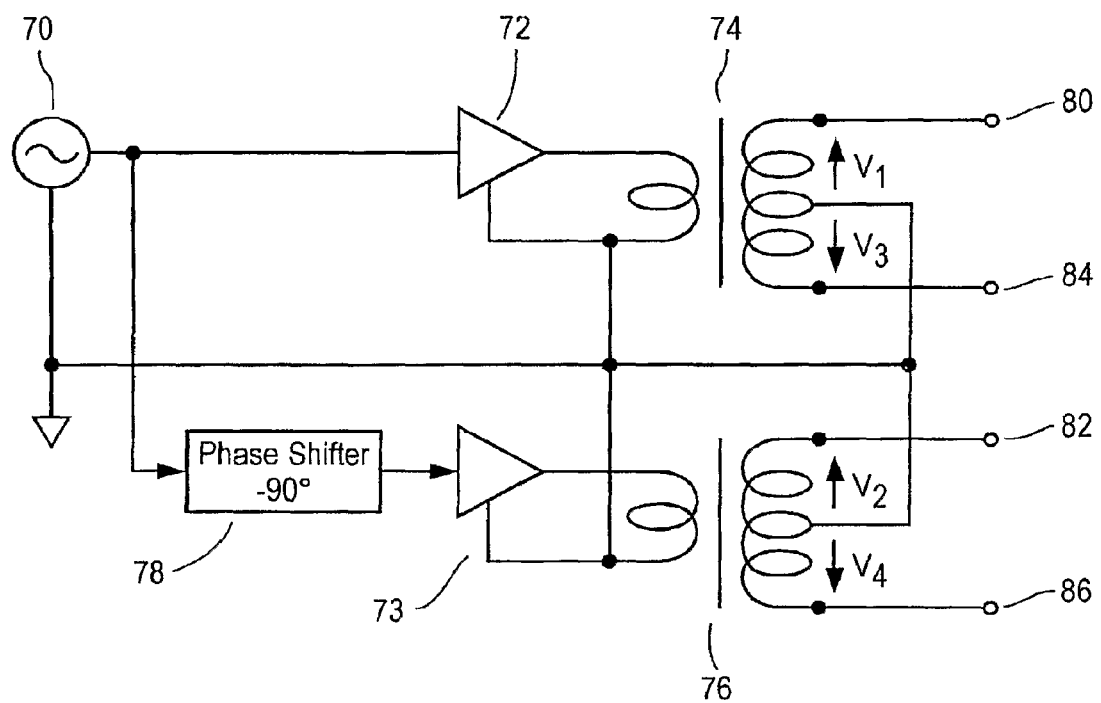
FIG. 5 depicts a circuit for generating four-phase power to energize a electrodes in a fluidized bed reaction of the invention.

A variety of circuits may be used to produce different-phase versions of the same waveform. An exemplary circuit is given in FIG. 5. There is an oscillator 70 which drives a power amplifier 72 and a 90° phase shifter 78, the latter in turn driving power amplifier 73. The output of each power amplifier is fed into its respective transformer 74 and 76. Taps are taken off the power transformers to drive electrodes through connections 80, 82, 84, and 86.

It is to be understood that while the invention has been described in conjunction with the preferred specific embodiments thereof, the foregoing description is intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties. However, where a patent, patent application, or publication containing express definitions is incorporated by reference, those express definitions should be understood to apply to the incorporated patent, patent application, or publication in which they are found, and not to the remainder of the text of this application, in particular the claims of this application.

The following examples are put forth so as to provide those of ordinary skill in the art with a complete disclosure and description of how to implement the invention, and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. and pressure is at or near atmospheric.

EXAMPLE 1

A fluidized bed reactor is constructed comprising a tube of inner diameter 22 mm, a gas inlet passing through a distributor, a metal frit serving as an electrode, and a mesh electrode which is movable with respect to the tube. Helium is supplied at 0.6 liters/min to create a fluidized bed of porous aluminum oxide particles of about 60 μm mean diameter. A multi-arc may be produced in this reactor by energizing the electrodes at about 1 kV and frequencies ranging from 500 Hz to 3000 Hz.

EXAMPLE 2

Figure 6:
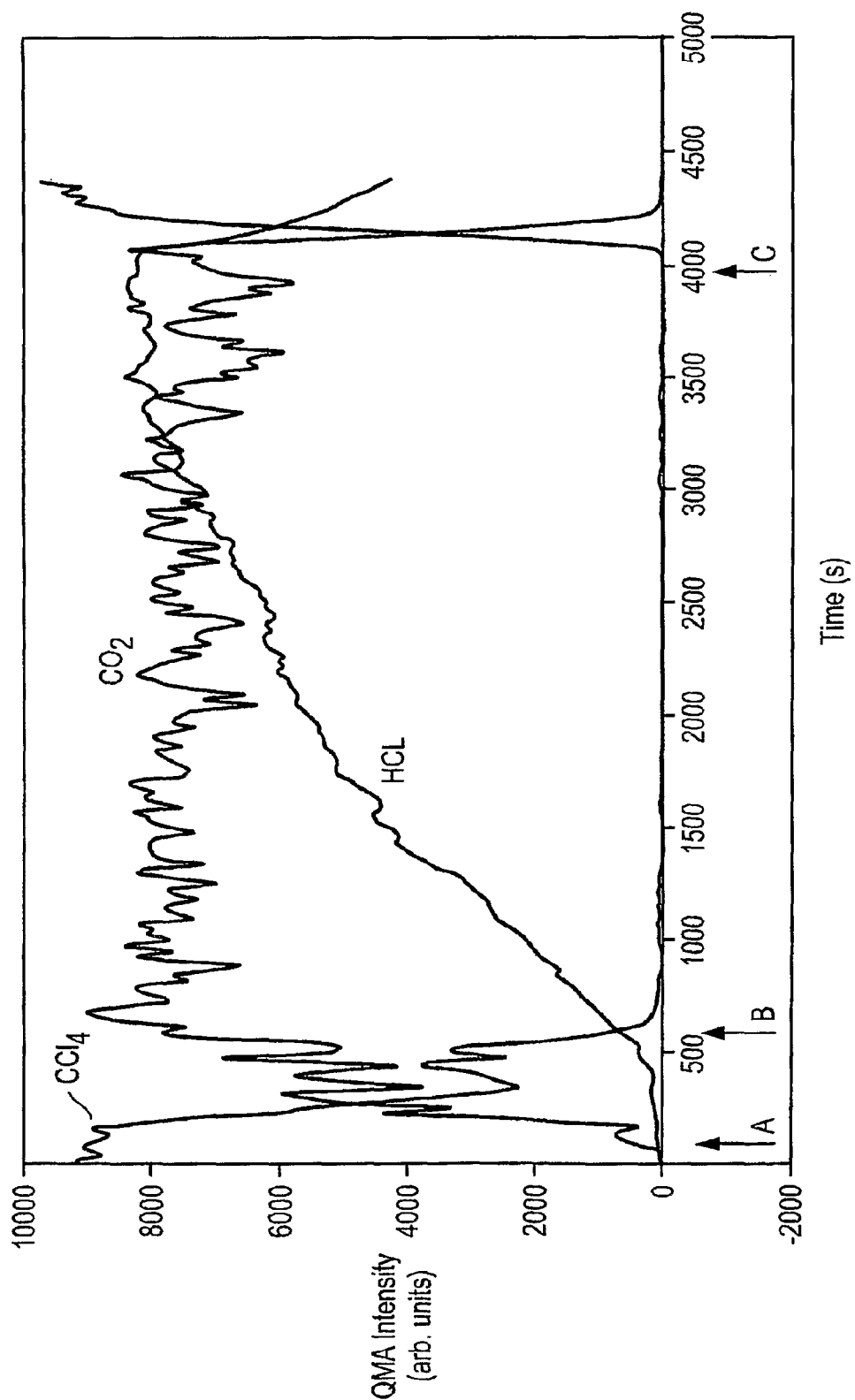
FIG. 6 depicts the decomposition of $CCl_4$ in a fluidized bed with a multi-arc discharge and with $H_2O$ as a reactant.

The reaction $CCl_4 + 2H_2O \rightarrow CO_2 + 4HCl$ is carried out as follows. A flow of He of 0.6 liters/min is provided to a fluidized bed reactor comprising a porous aluminum oxide powder, forming a fluidized bed. A flow of 0.5 ml/hour of $CCl_4$ and 0.5 ml/hour of $H_2O$ is supplied. A multi-arc discharge is started up over a period of 600 s and continued at full strength until 4000 s have elapsed. A voltage of about 1 kV is applied at frequencies of about 2000 Hz between two steel screen electrodes, one situated at the bottom of the bed immediately on top of the distribution plate and a second a few mm from the top of the bed during fluidization. The bed thickness is about 1 cm. The concentrations of gases exiting the reactor are measured using a quadrupole mass analyzer (QMA). FIG. 6 depicts the resulting measurements, where it is seen that the multi-arc discharge has permitted the reaction of $CCl_4$ and $H_2O$ to occur.

EXAMPLE 3

Using the same design and working conditions as in Example 2, $TiCl_4$ and $N_2$ were injected. A golden TiN coating was obtained on a quartz tube partially immersed in the bed.

The invention claimed is:

1. A method of generating a multi-arc discharge, comprising:
   providing a mass of particles in a reaction chamber,
   pumping a fluid at about atmospheric pressure or higher through the reaction chamber at a rate sufficient to form a moving bed with the mass of particles, wherein the moving bed is a fluidized bed, and
   exciting electrodes at a frequency between 500 Hertz (Hz) to 3000 Hz and to predetermined voltages selected to produce the multi-arc discharge, wherein an arc of the multi-arc discharge propagates from particle to particle of the mass of particles.

2. The method of claim 1, wherein the particles are non-conductive.

3. The method of claim 1, wherein the fluid comprises at least two components which react with each other.

4. The method of claim 1, wherein the fluid comprises a component which reacts with a surface of at least some particles in the mass of particles.

5. The method of claim 1, wherein the fluid comprises a component which reacts with another moiety after having passed through the multi-arc discharge.

6. The method of claim 1, wherein the fluid comprises a component which reacts with catalytic or absorbent materials in the moving bed.

7. The method of claim 1, wherein a bed density of the moving bed is at least about 0.1 $g/cm^3$ by volume.

8. The method of claim 7, wherein a bed density of the moving bed is at least about 1 $g/cm^3$ by volume.

9. The method of claim 3, wherein the fluid comprises at least one component which is a halogenated organic compound which reacts with another component of the fluid.

10. The method of claim 9, wherein the halogenated organic compound is $CCl_4$ or a dioxin.

11. The method of claim 1, further comprising:
    partially immersing a workpiece into the moving bed, wherein a coating is deposited on the workpiece.

* * * * *